July 1, 1952   J. W. SAWYER   2,601,703
METHOD FOR TESTING SURFACE DEFECTS
Filed March 2, 1949   4 Sheets-Sheet 1
FIG. I.
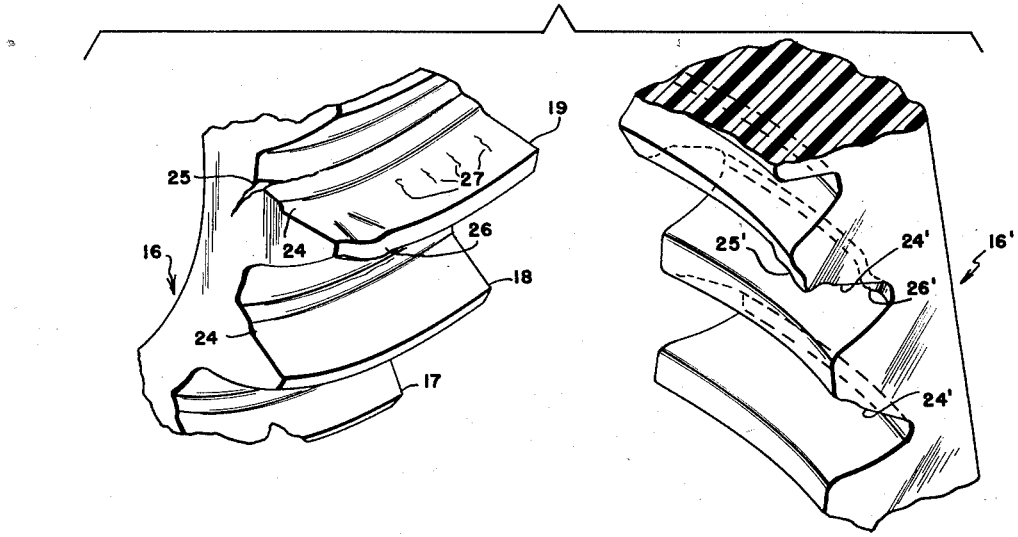
FIG. 2.
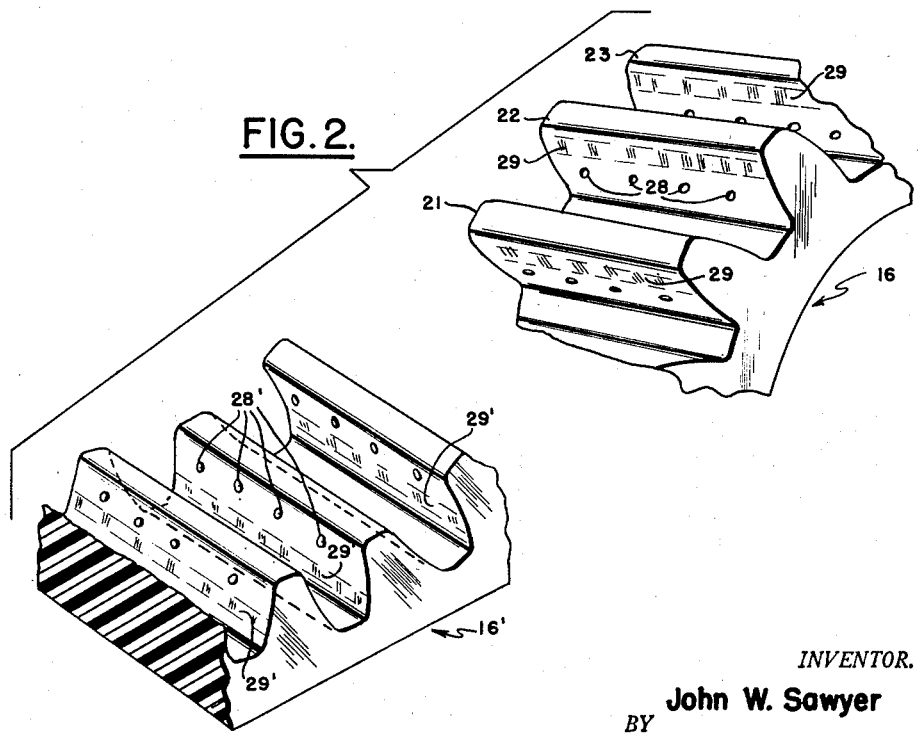
INVENTOR.
John W. Sawyer
BY
Attorney July 1, 1952         J. W. SAWYER         2,601,703
METHOD FOR TESTING SURFACE DEFECTS Filed March 2, 1949         4 Sheets-Sheet 2

*INVENTOR.*
John W. Sawyer
BY
Attorney

July 1, 1952 J. W. SAWYER 2,601,703
METHOD FOR TESTING SURFACE DEFECTS
Filed March 2, 1949 4 Sheets-Sheet 3

INVENTOR.
John W. Sawyer
BY
Attorney

July 1, 1952  J. W. SAWYER  2,601,703
METHOD FOR TESTING SURFACE DEFECTS
Filed March 2, 1949  4 Sheets-Sheet 4

INVENTOR.
John W. Sawyer
BY
Attorney

Patented July 1, 1952

2,601,703

UNITED STATES PATENT OFFICE 2,601,703

METHOD FOR TESTING SURFACE DEFECTS

John W. Sawyer, United States Navy,
Arlington, Va.

Application March 2, 1949, Serial No. 79,264

2 Claims. (Cl. 18—47.5)

(Granted under the act of March 3, 1883, as
amended April 30, 1928; 370 O. G. 757)

This invention relates generally to the art of inspecting and testing surfaces for defects, and more specifically to construction of plastic negative replicas of surfaces of machine elements such as gears and bearings and subsequent testing of the replicas to determine the nature and extent of surface defects shown thereon.

The method of this invention is particularly useful in the inspection of gears and shafts of power plants and gear reduction systems, internal threads, boiler tubes, metallic pressure lines and other systems wherein surface testing is essential for determination of the condition of wear, damage or fracture. Particularly in machinery for transmission of large amounts of power the gearing is subject to wear and the development of pitting, spalling, galling, abrasion, progressive fracture and other defects, the existence of which can be detected in early stages of development by inspection, and knowledge of the extent or advancement of which is essential to determine periodically the remoteness of ultimate failure.

Where such gearing, machinery or other equipment is relatively inaccessible, or only portions thereof accessible, it is frequently not possible to make a visual inspection. Furthermore, such machinery is often used in remote locations such that no skilled metallurgical or mechanical engineer is available who could make a sufficient inspection at the location. It follows that the problem of inspection in remote locations is very difficult and substitute procedures will promote efficiency and will effect large savings by elimination of sudden power failures.

When the nature of a defect observable at the surface is known or suspected and it is necessary to evaluate the degree or state of advancement thereof it is the experience of the industry that the present practice of verbal descriptions is inadequate, misleading and quite unreliable, and that the use of photographs, while helpful where lighting can be controlled, is utterly inadequate when the subject matter is a gear or other shape which inherently has great variations in shadow such as to conceal the light and shadow effects photographed. Such photographs, even when accompanied by careful verbal description, are found wholly inadequate for engineering evaluation purposes. Careful measurements of depths of pits and scratches by means of laboratory instruments are essential for analysis of defects. This is difficult or impossible at the roots of the gears even when the gears are accessible and negative replicas are found ideally suited for measurement.

This invention provides a means for transferring to the laboratory an exact negative replica of the surface defect to be tested in a method of testing which has heretofore not been available to the industry. It is of particular use in naval vessels and mine installations remote from the engineering headquarters. In such circumstances the decision as to when or whether a major overhaul is to be performed must be made by engineering personnel who have no opportunity to see the equipment, nor any reliable guide to the condition thereof. Descriptions in general terms by personnel who are not trained to observe the details on which the skilled engineer depends, and pictures which are subject to gross misinterpretation, in the experience of the industry, are not subject to the kind of measurement and analysis which is found to be necessary to intelligent decision.

An object of the present invention is to provide method for reproducing the surface characteristics of machine elements in permanent form for study and analysis.

Another object is to provide a method of testing gears and the like for advance indications of ultimate failure.

Another object is to provide method for obtaining cast negative replicas of gear surfaces and other surfaces of curved or intricate nature.

A further object is to provide a method of inspection of surfaces of elements to determine progressive deterioration of the elements by comparing successive quantitative measurements of developing surface defects.

Other objects and features of the invention will become apparent to those skilled in the art as the disclosure is made in the following detailed description of a preferred embodiment of the invention as illustrated in the accompanying sheets of drawings in which:

Fig. 1 is an exploded perspective view of a section of a gear and the plastic negative replica thereof.

Fig. 2 is an exploded perspective view of another gear section and the negative replica thereof.

Figure 3:
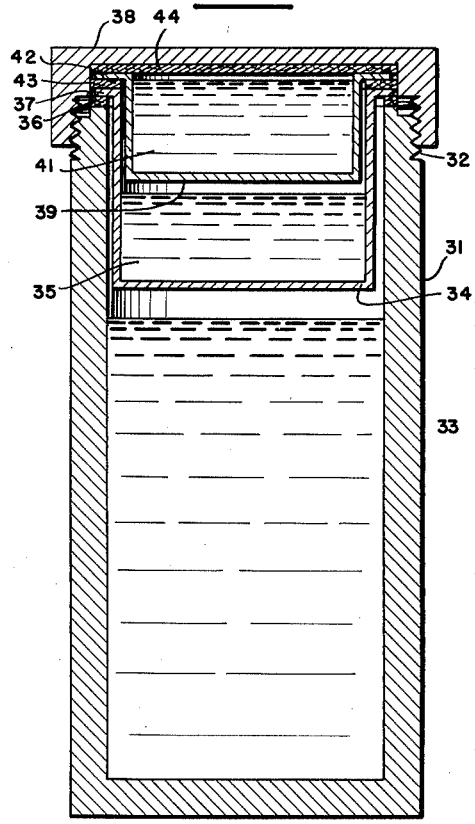
Fig. 3 is a vertical sectional view of a container for storing plastic, activator and catalyst in a unit package.

The present invention differs from prior methods of taking wax impressions in that the present method provides a rigid cast model of extremely fine-textured material capable of exhibiting the finest detail of surface structure and irregularities. Moreover, this method of casting produces a model which has considerable strength and rigidity under conditions of use, for example, when a metallic probe is repeatedly passed over the surface of the mold in order to detect, measure and record fine details of structure. It has been found that certain plastics suitable for this purpose exhibit a sheen, polish or degree of roughness which corresponds almost exactly to appearance of the metal surface from which it is taken.

Portions of replicas, according to this invention, clearly exhibit the satin-like lustre of the originally ground or honed surface of the gear, other portions showing a glossy appearance corresponding to the glossiness of the portion of the tooth which has been polished by normal wear under proper lubrication. Slight deformations in the gear tooth may result in slight wear on the back surface thereof at the point of deformation and the plastic model reveals a shiny or glossy spot conforming exactly to the corresponding spot on the tooth. Minute fractures or cracks which are themselves hardly visible on the tooth are likewise shown in a model taken therefrom by this method. The slight irregularities at the base or root of each tooth corresponding to the honing or grind marks of the gear as originally manufactured are revealed in the model.

The usual method of forming or casting plastics is not suitable for this purpose because of the fineness of structure required in the surface of the plastic. The plastic is in a liquid form of low viscosity in contrast to the usual plastic, in order that it will flow freely into the minutest cracks, depressions or scratches, without the inclusion or retention of air bubbles. Furthermore, pressure casting cannot ordinarily be used to form the plastic on the surfaces. While it is desirable to employ a filler in the plastic matrix, this filler must also be of special characteristics in order that it may be ground to extremely fine proportions. For this purpose finely ground asbestos fibre has been successfully employed. The quantities or proportions of filler to matrix is variable according to the shrinkage characteristics found desirable. The use of too much filler results in some loss of detail when surface irregularities of the order of a few millionths of an inch are to be investigated. If too little filler is employed, the plastics presently available exhibit a considerable shrinkage during setting, such that measurements are rendered difficult or uncertain, and in the case of deep pitting, a small amount of shearing may occur. Among the plastic bases or resins which have been found to give good results by this method of surface reproduction are the following: phenolics, polyesters and silicones in the thermosetting plastics and vinyls, celluloses and nylon in the thermoplastics.

According to this invention it has been found that castings in plastic can be made providing negative surface replicas which preserve to millionths of an inch the exact structure of the surface of a gear section, gear face, thread, tube interior, or other intricate form, which is subjected to wear, pitting or corrosion. For this purpose special plastics have been developed having suitable characteristics of absence of grain, absence of shrinkage and low viscosity before setting. Any suitable thermo-setting or thermoplastic resin may be employed, which has these characteristics and the permanence and rigidity required to preserve the model. The cast negative replica may then be removed and forwarded to a laboratory for study, measurement and analysis by laboratory techniques or presented for consideration by the most skilled engineers available. The excellence of the models formed in this way permits a degree of laboratory study not heretofore possible. Each detail of structure of the replica can be examined and measured with the precision instruments found only in engineering laboratories.

The mold may be formed according to various methods and by use of a variety of forms. Gear face molds are conveniently formed at the top of a gear by dams and dikes fastened to the gear face. For example, "Scotch tape" may be employed when fastened along the ends of the teeth at the sides of the gear wheel, protruding above the teeth sufficiently to form a shallow trough over the teeth, and the mold terminated at the ends of the gear section being investigated by further dams of "Scotch tape" placed along terminal teeth of the gear section, and extending thereabove to complete the trough. Alternatively, dams and dikes for forming liquid-tight wells to hold the fluid plastic may be made of putty, rubber, wax and the like.

In Fig. 1 the gear section is represented generally by the numeral 16 having gear teeth 17, 18, and 19. Normal gear wear is illustrated at 24 and the corresponding positions 24' on the plastic casting 16'. Strain fracture 25 at the root of tooth 19 indicates approaching failure of the tooth, and is faithfully represented in the cast replica at 25'. A further tooth deformation 26 at the crest of the tooth is represented at 26' in the cast model. Scratch marks 27 are not seen on the model because of the perspective chosen.

In Fig. 2 teeth 21, 22 and 23 show other defects such as spalling at 28, reproduced in the cast at 28', and abrasion marks as at 29 on the gear 29' on the replica thereof. The satin-like finish of the original gear as ground and the glossy face of a wear-polished face are not readily shown in a drawing. Finer details of surface structure are omitted entirely in the drawings since these cannot be represented even approximately except by very much enlarged views. It is this difficulty of representation by drawings or photographs which illustrates one of the advantages of this invention.

In the preparation of a plastic for reproduction of a surface according to this invention it is found convenient to employ a package containing a plastic matrix in which the filler is already mixed, the whole mass having a watery consistency so as to be free-flowing and easy of application. Usually within the same container is enclosed a second package or tube containing a second liquid comprising the activator, plasticizer, catalyst and other materials found necessary or desirable so that a complete mixture is readily available upon the opening of a single container. Separate containers for the two or three fluids thus employed are sealed against the air and against mixing in a number of different ways, two of which are illustrated in the drawings.

Figure 4:
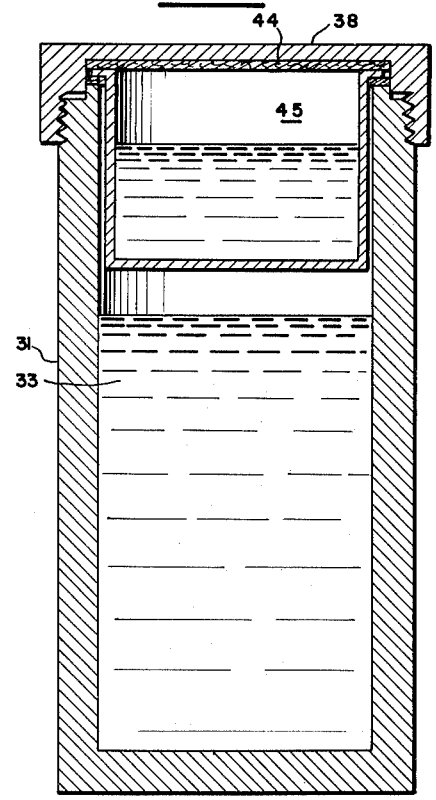
Fig. 4 is a vertical sectional view of a container for a two solution mix.
Figure 5:
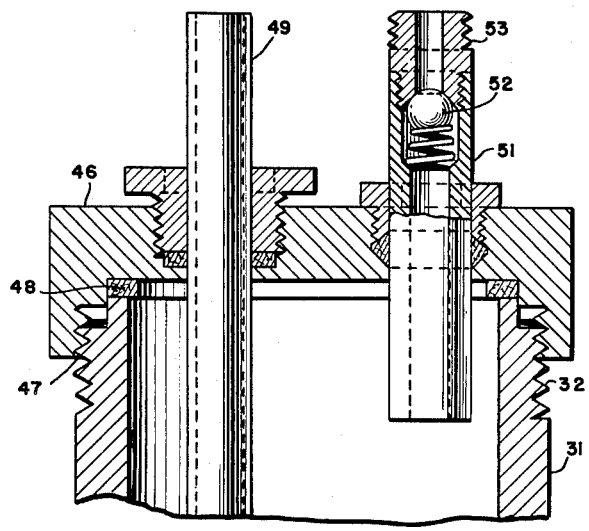
Fig. 5 is a sectional view of an applicator top for replacing the storage top of Figs. 3 and 4.

In Figs. 3-5 there is illustrated one form of a container which is suitable for storing the liquid form of plastic found desirable for use in this method of testing surfaces. An outer can 31 of any suitable material is formed with means for securing a cover, preferably a screw thread 32, the can 31 being filled to a suitable level with the liquid plastic 33 in which is suspended the filler and any other ingredients which may be stored therewith. An inner container 34, partially filled with the catalyst 35 is fitted within the upper portion of the can 31. A gasket 36 at the upper lip of the can 31 and a flange 37 turned on the container 34 seal the can 31 when the cover 38 of the can 31 is in place. A second inner container 39 has therein the activator, accelerator and other ingredients 41 which must be stored separately from the catalyst and plastic resin. A flange 42 of the container 39 fits over the flange 37 and is separated therefrom by the gasket 43, sealing the container 34 and gasket 44 seals the container 39 when the cover 38 is in place.

In Fig. 4 the single inner container 45 replaces the containers 34 and 39 for use when the ingredients can be stored in two rather than three compartments.

The storage cover 38 is removed when it is desired to make a plastic replica and the ingredients in the can 31 and container 45 or containers 34 and 39 are mixed. The plastic is then ready for immediate use, and may be poured into a suitable cavity mold already placed on the surface to be tested. As the plastic begins to harden by chemical action a certain amount of heat is generated which further augments the hardening process.

For convenience in applying the liquid plastic to the mold the applicator cover 46 is provided, as in Fig. 5, having threaded portions 47, and sealing the can 31 by the gasket 48. The cover 46 is provided with an outlet tube 49, which may be of any suitable length and curvature, or a flexible material. Means of exhausting the liquid plastic mix from the can 31 may be provided as by the air tube 51 which is sealed in the cover 46, and which may be provided with a check valve as at 52. A screw connection 53 may be provided for attaching a small hand pump or other device for applying air pressure to force the liquid from the can 31.

Figure 9:
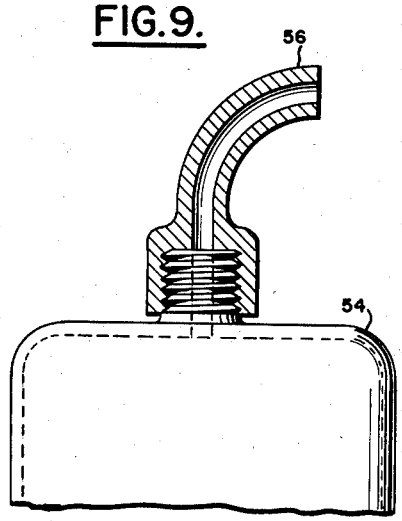
Fig. 9 is a sectional view of an applicator attached to the tube of Fig. 6.

A second form of plastic container suitable for storing and applying the various plastic mixtures employed is illustrated in Figs. 6-9. The tube 54 is fitted with a storage cover or screw cap 55 which seals the tube 54 and which may be removed and replaced by a suitable applicator nozzle 56 as illustrated in Fig. 9. The tube 54 may be of metal foil or of any plastic material which is not affected by the liquid plastic contained therein. This tube is normally closed at the end opposite the screw cover by a crimping operation, heat seal, or other suitable conventional means. In the form illustrated this tube contains a second flexible tube 57 within which is stored the plasticizer, activator, accelerator, catalyst, and other components of the mixture which must be stored separately from the plastic base contained in the tube 54. This inner tube 57, as illustrated, is conveniently sealed separately by a crimping or heat sealing operation shown generally at 58, this tube having a tab 59 or extension at the sealed end which is inserted at the open end of the outer tube 54 between the sides thereof and held there temporarily while the outer tube is filled and crimped or otherwise sealed. Thus when the outer tube is filled and the inner tube placed therein and the seal made, both liquids are contained in separate packages in a single outer package. The location of the inner package within the outer package is definitely fixed such that the mixing of the two liquids is facilitated as follows: A slight pressure on the outer tube in the region surrounding the inner tube causes a rupture of the inner tube material because of its thinner and weaker construction, or because of scoring illustrated at 61 in the drawing. A small pressure on the outer tube thus causes a rupture and mixing of the two fluids, and the operator is easily able to tell when the inner tube is broken by the decrease in resistance to hand pressure. Because of the location of the inner tube within the outer in a definite fixed location metal foil or other non-transparent material may be used for holding and storing the liquids.

Figure 6:
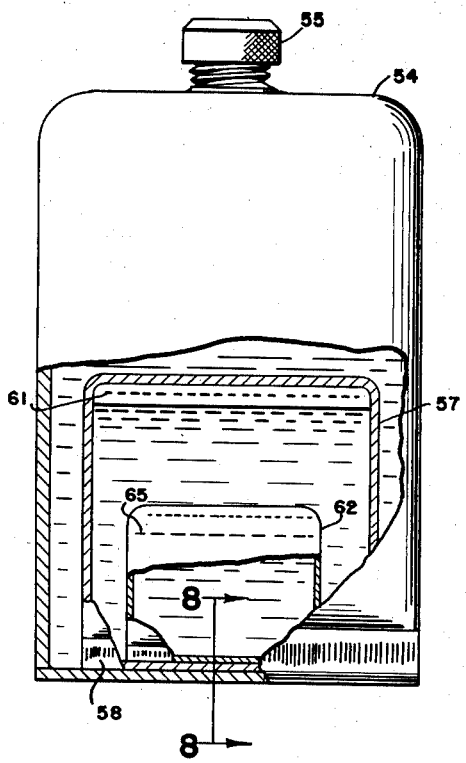
Fig. 6 is a front elevation partly in section of a collapsible tube container for plastic, catalyst and activator liquids.
Figure 7:
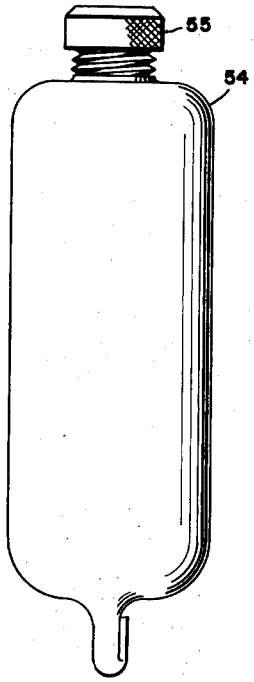
Fig. 7 is a side elevation of the tube of Fig. 6.
Figure 8:
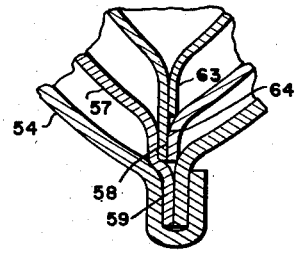
Fig. 8 is a sectional detail of sealing means securing the three containers in fixed positional relationship.

In the event three liquids are required, a third package 62 smaller than the second may be inserted within the second and sealed as at 63 in the manner thereinbefore described and provided with tab 64 for sealing in seal 58. As illustrated in Fig. 6 the innermost tube is in a definite location within the second tube and hence easily ruptured so that the third liquid may be mixed with the second prior to mixing of the second fluid with the fluid in the outer tube. This is facilitated by forming the innermost tube 62 of material thinner than that of the outer tubes or by more deeply scoring the free end thereof as at 65. It is found that the tubes constructed in this manner may be readily manipulated by the operator, though made of opaque material, when located definitely and securely fastened to the crimped or sealed edge of the outer tube, as illustrated.

Figure 10:
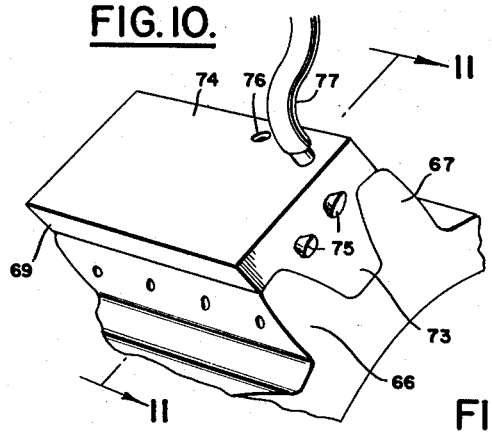
Fig. 10 is a side elevation of a gear tooth mold for casting a negative replica of a gear section.
Figure 11:
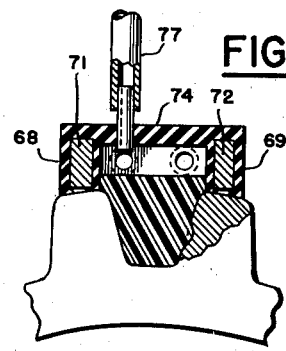
Fig. 11 is a sectional view through 11—11 of Fig. 10.

In Figs. 10 and 11 is shown a form of mold suitable for use on gears or other structures of magnetic material where only a portion of the surface is to be reproduced for test. The space between teeth 66 and 67, for a portion of the length of the teeth, may be enclosed as illustrated. Lateral walls 68 and 69 are formed preferably of a resilient material such as rubber, being sufficiently flexible to conform to the curvature of the surface, such as the outer faces of a helical gear. Within walls 68 and 69 are holes of suitable size to receive and retain hold-on magnets 71 and 72 which may be distributed at intervals within the walls 68 and 69, sufficiently close to maintain contact between the flexible walls and the curved face of teeth 66 and 67. End walls as at 73 are cemented to the side walls, or formed integrally therewith and have a shape to conform roughly to the space to be filled or dammed. A mold top 74 is cemented to the walls or formed integrally therewith. Holes through the top and at least one end provide access for filling, holes not used being plugged as at 75.

During filling a vent role 76 is left at the uppermost edge of the cavity and the filling tube or applicator 77 inserted in another hole at the same upper edge for completely filling the mold.

By use of the magnetic hold-on method, sponge rubber dams and walls may be used, so as to avoid the necessity of exact cutting and fitting of the mold structure to the surface contours. Thus the mold may be quickly made and inserted, though the fit is not good and the magnets hold the contact between mold and surface sufficiently to permit casting a surface replica.

Figure 14:
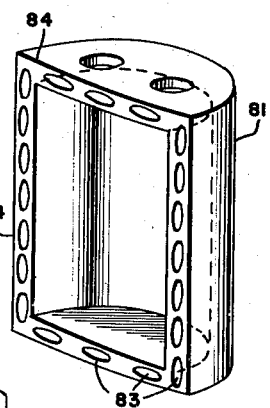
Fig. 14 is a front perspective view of the mold of Fig. 12 in the scale of Fig. 13.
Figure 12:
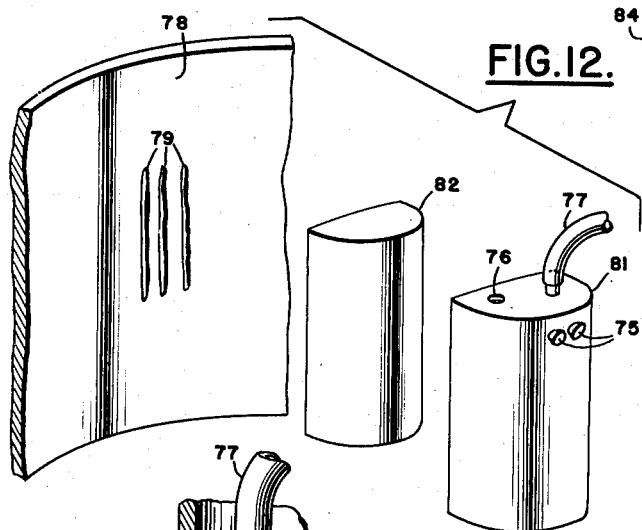
Fig. 12 is an exploded perspective view of an internal cylindrical surface, a mold therefor and the molded negative replica of the surface.
Figure 13:
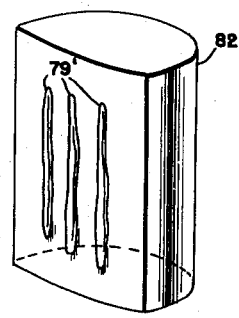
Fig. 13 is a front perspective view, somewhat enlarged, of the molded surface of Fig. 12.
Figure 15:
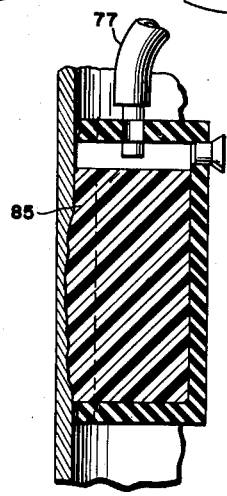
Fig. 15 is a vertical sectional view of the filled mold, attached to the surface of Fig. 12.

Fig. 12 illustrates an internal cylindrical surface and the formation of a cast thereon. The surface 78 may be a bearing, boiler tube or the like, having defects 79 due to strain, burning or pitting. The mold 81 and casting 82 are shown more clearly in Figs. 14 and 13, rotated to show surface and hold-on means. The reproduced surface structure is shown at 79'. The mold is held in place during casting by the suction cups 83 arranged in the surface-adhering edges 84 of the mold 81. The mold is made of rubber-like material sufficiently flexible to conform to the surface and to permit forcing of some of the air from the suction cups 83 by local pressure thereon. When the mold has been firmly pressed against the surface 78, as illustrated in Fig. 15 it remains in position because of the suction cup arrangement and may be filled from the uppermost holes through a tube or applicator 77. When the plastic material 85 has hardened the mold and cast are readily removed as illustrated in Fig. 12, preserving the cast negative replica of the surface detail.

After securing a cast replica such as 82 or 16' the replica may be inspected and tested in the same manner as the gear, bearing, or other surface would be tested if available in the laboratory. For example, a Brush analyser may be employed to test the surface in the laboratory, the surface may be examined by microscope or the structure thereon may be measured accurately by means of a standard profilometer or profilograph. The hardened plastic material may also be subjected to a number of tests in succession without loss of detail due to wear or breakage. The absence of grain structure permits measurements not possible with ordinary cast images.

Standards of surface texture and smoothness comparison blanks have been successfully reproduced by this method to serve as secondary standards with accuracy to a few millionths of an inch. The permanence and grainlessness of the casts and the perfection of the detail exhibited permit laboratory examination of surface detail of machine elements without disassembling or moving the machine, thereby increasing the frequency and precision of testing and inspection, and by use of a chronological series of replicas from the same defect progressive deterioration may be measured and the growth of defects recorded for study.

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. The method of measuring microscopic surface irregularities in machine elements located in a place inaccessible for direct measurement which comprises the steps of forming a self-adhering liquid-tight mold about said irregularities, incorporating a catalyst in a sufficient amount to cause hardening at approximately room temperature into a normally free flowing, grainless, hardenable, molding, thermosetting material which contracts a negligible amount upon hardening, forming a negative surface image of selected portions of said elements by pouring said thermosetting material in said mold, hardening said molding material in place within said mold, removing the hardened plastic image from the mold and from the surface whose irregularities are to be duplicated, and measuring the surface irregularities in the negative plastic image remote from said place.

2. In the art of forming a negative surface replica of gear teeth irregularities for mechanical measurement thereof, the steps of forming a self-adhering closed mold along the face of said gear, introducing a normally free-flowing, thermosetting, liquid molding material capable of contracting only a negligible amount upon hardening into a cavity formed by said closed mold, mixing a chemical hardening agent with said liquid molding material prior to setting thereof, placing said liquid molding material under pressure slightly exceeding atmospheric pressure and less than sufficient to strip said closed mold from said gear face, and removing said mold containing said molding material after the latter has solidified, to preserve in durable and rigid form microscopic details of said irregularities.

JOHN W. SAWYER.

REFERENCES CITED

The following references are of record in the file of this patent:

UNITED STATES PATENTS

| Number | Name | Date |
| --- | --- | --- |
| 1,426,512 | Schiffhauer | Aug. 22, 1922 |
| 1,583,381 | Zimmerman | May 4, 1926 |
| 1,977,580 | Grier | Oct. 16, 1934 |
| 1,989,944 | Quigg | Feb. 5, 1935 |
| 2,063,315 | Kuettel | Dec. 8, 1936 |
| 2,071,907 | Tattersall | Feb. 23, 1937 |
| 2,207,730 | Gottlieb | July 16, 1940 |
| 2,218,260 | Forbes | Oct. 15, 1940 |
| 2,370,389 | Bessin et al. | Feb. 27, 1945 |
| 2,403,016 | Noble | July 2, 1946 |
| 2,405,245 | Ushakoff | Aug. 6, 1946 |
| 2,424,278 | Kunkel | July 22, 1947 |
| 2,445,583 | Moroco | July 20, 1948 |
| 2,453,604 | Tenenbaum et al. | Nov. 9, 1948 |

OTHER REFERENCES

Journal of The American Society of Naval Engineers, vol. 58, February 19, 1946, page 17; "Surface Finishing of Reduction Gear Teeth," by Davis.